United States Patent [19]
Miller et al.

[11] Patent Number: 5,817,240
[45] Date of Patent: Oct. 6, 1998

[54] CATALYTIC FIXED BED REACTOR SYSTEMS FOR THE DESTRUCTION OF CONTAMINANTS IN WATER BY HYDROGEN PEROXIDE

[75] Inventors: Christopher M. Miller, Akron, Ohio; Richard L. Valentine, Iowa City, Iowa

[73] Assignee: The University of Akron, Akron, Ohio

[21] Appl. No.: 745,811

[22] Filed: Nov. 12, 1996

[51] Int. Cl.$^6$ .................................................... C02F 1/72
[52] U.S. Cl. .......................................... 210/759; 210/763
[58] Field of Search .................................. 210/759, 763, 210/198.1, 205

[56] References Cited

U.S. PATENT DOCUMENTS

| | | | |
|---|---|---|---|
| 3,944,487 | 3/1976 | Davis et al. | 210/62 |
| 3,965,249 | 6/1976 | Kinosz | 423/497 |
| 4,073,873 | 2/1978 | Caldwell et al. | 423/499 |
| 4,297,333 | 10/1981 | Crawford et al. | 423/241 |
| 4,321,143 | 3/1982 | Wilms et al. | 210/631 |
| 4,361,486 | 11/1982 | Hou et al. | 210/722 |
| 4,400,304 | 8/1983 | Clark et al. | 252/430 |
| 4,732,688 | 3/1988 | Bryan et al. | 210/759 |
| 4,743,381 | 5/1988 | Bull | 210/759 |
| 5,348,665 | 9/1994 | Schulte et al. | 210/759 |
| 5,376,284 | 12/1994 | Takemura et al. | 210/759 |

FOREIGN PATENT DOCUMENTS

| 205194 | 8/1988 | Japan | 210/759 |
|---|---|---|---|

OTHER PUBLICATIONS

"Formation of Superoxide Ion During the Decomposition of Hydrogen Peroxide on Supported Metals" by Ono et al., *Journal of Physical Chemistry*, vol. 81, No. 13, pp. 1307–1311, 1977.

"Formation of Superoxide Ion During the Decomposition of Hydrogen Peroxide on Supported Metal Oxides" by Kitajima et al., *The Journal of Physical Chemistry*, vol. 82, pp. 1505–1509, 1978.

"Studies on MnO2–III, The Kinetics and the Mechanism for the Catalytic Decomposition of $H_2O_2$ Over Different Crystalline Modifications of $MnO^{2-}$" by Kanungo et al., *Electrochimica Acta*, vol. 26, pp. 1157–1167, 1981.

"Hydrogen Peroxide Decomposition and Quinoline Degradation in the Presence of Aquifer Material" by Miller and Valentine, *Water Research*, vol. 29, No. 10, 2353–2359, 1995.

"Oxidation Behavior of Aqueous Contaminants in the presence of Hydrogen Peroxide and Filter Media" by Miller and Valentine, *Journal of Hazardous Materials*, vol. 41, 105–116, 1995.

*Primary Examiner*—Neil McCarthy
*Attorney, Agent, or Firm*—Renner, Kenner, Greive, Bobak, Taylor & Weber

[57] ABSTRACT

A process for the treatment of an aqueous media having contaminants therein, comprising adding hydrogen peroxide to the aqueous media; and exposing the aqueous media to a catalytic environment for a time long enough to form usable reactive intermediates and short enough to prevent scavenging of the usable reactive intermediates formed. Also provided is a reactor for achieving the process.

12 Claims, 2 Drawing Sheets

CATALYTIC FIXED BED REACTOR SYSTEMS FOR THE DESTRUCTION OF CONTAMINANTS IN WATER BY HYDROGEN PEROXIDE

TECHNICAL FIELD

The present invention generally relates to processes for the treatment of contaminated aqueous mediums. More particularly, the processes employ hydrogen peroxide for the degradation of contaminants in aqueous medium. Specifically, the processes increases and preferably maximizes the availability of usable reactive intermediates derived from hydrogen peroxide interaction with a catalyst by controlling the exposure time of hydrogen peroxide with the catalyst. Also provided are apparatus for achieving the processes of the present invention.

BACKGROUND OF THE INVENTION

Oxidation processes are one important class of treatment technology that destroy contaminants in aqueous media and yield harmless products. For purposes of this disclosure, the terms destruction and degradation of contaminants will refer to the transformation of such contaminants, including any form of transformation such as polymerization, bond-breaking or even complete oxidation to carbon dioxide. One such oxidation process generally involves reactions of organics with reactive species such as hydroxyl radicals, superoxides, hydrated electrons and singlet oxygen. Ozone with ultra-violet light and ozone with hydrogen peroxide have been successfully used for the treatment of synthetic organics and chemicals resistant to biological degradation. These processes, however, suffer from being more expensive than traditional water treatment processes, and are subject to radical traps that can severely reduce their efficiency.

Hydrogen peroxide has been used as an oxidant in engineered systems for treatment of liquid wastes and as a source of oxygen for enhanced bioremediation in aquifers and soil systems. The use of hydrogen peroxide is based on the exploitation of its decomposition chemistry, which can involve the formation of reactive intermediates such as hydroxyl radicals (OH·), perhydroxyl radicals ($\cdot HO_2$), and superoxide radical anions ($O_2^-$). For example, the reaction of hydrogen peroxide with ferrous iron, commonly referred to as Fenton's reagent, has been shown to produce hydroxyl radicals. Hydroxyl radicals are one of the most powerful oxidizing species known, capable of reacting with a wide range and number of organic compounds.

Heretofore in the art it has generally had been believed that the contaminant degradation efficiency of a hydrogen peroxide system could be increased by increasing the amount and rate of hydrogen peroxide decomposition, which was believed to lead to a proportional increase in usable reactive intermediates, i.e., those intermediates that react with the contaminant and lead to the degradation of the contaminant. It was also believed that increased efficiency could be achieved by increasing the concentration of hydrogen peroxide within the system, as well as by increasing the exposure time between the hydrogen peroxide and catalyst. In other words, it was believed that the mass of hydrogen peroxide decomposed increased as the hydrogen peroxide was in contact with the catalyst, thereby leading to increased concentrations of intermediates that would react and degrade contaminants. It has recently been discovered, however, that the formation of useful intermediates from hydrogen peroxide is not proportional to the amount of hydrogen peroxide decomposed and/or the exposure time between hydrogen peroxide and the catalyst. That is, as hydrogen peroxide is decomposed by catalysis, the concentration of useful reactive intermediates does not increase with increasing concentrations of hydrogen peroxide added to the system. In fact, useful intermediate concentration is believed to decrease.

It is generally believed that the decrease in useful intermediate concentration is a result of scavenging by the catalytic material. Heretofore in the art, attempts to prevent this scavenging included covering up surface sites or adding amendments to the catalyst to control the reactive pathways. A more detailed explanation of these mechanisms is set forth hereinbelow.

Thus, a need exists to develop a hydrogen peroxide system for treatment of contaminants in aqueous media that reduces the inefficiencies associated with hydrogen peroxide systems known in the art.

SUMMARY OF INVENTION

It is therefore, an object of the present invention to provide a process for the efficient treatment of contaminated aqueous mediums.

It is another object of the present invention to provide a process whereby an increase in hydrogen peroxide loss would provide an increase in contaminant degradation.

It is yet another object of the present invention to provide a fixed bed reactor whereby an increase in hydrogen peroxide loss would yield an increase in contaminant degradation.

At least one or more of the foregoing objects, together with the advantages thereof over the known art relating to the treatment of contaminant solutions using hydrogen peroxide systems, which shall become apparent from the specification which follows, are accomplished by the invention as hereinafter described and claimed.

In general the present invention provides a process for the treatment of an aqueous media having contaminants therein, comprising adding hydrogen peroxide to the aqueous media; and exposing the aqueous media to a catalytic environment for a time long enough to form usable reactive intermediates and short enough to reduce and preferably minimize scavenging of the usable reactive intermediates formed. The process further comprises recycling the aqueous media previously removed from the catalytic environment by reexposing the media to the catalytic environment for a time long enough to form additional, usable reactive intermediates and short enough to reduce and preferably minimize scavenging of said additional usable reactive intermediates formed.

The present invention also includes a method for a reactor that employs hydrogen peroxide for the treatment of aqueous media containing contaminants comprising a catalytic bed having a volume; a catalytic material within said catalytic bed; and an external reactor, wherein said external reactor has a volume at least about 50 times greater than said volume of said catalytic bed thereby providing for a reaction time within said external reactor that is about 50 times longer than a reaction time within said catalytic reactor.

PREFERRED EMBODIMENT FOR CARRYING OUT THE INVENTION

Figure 1:
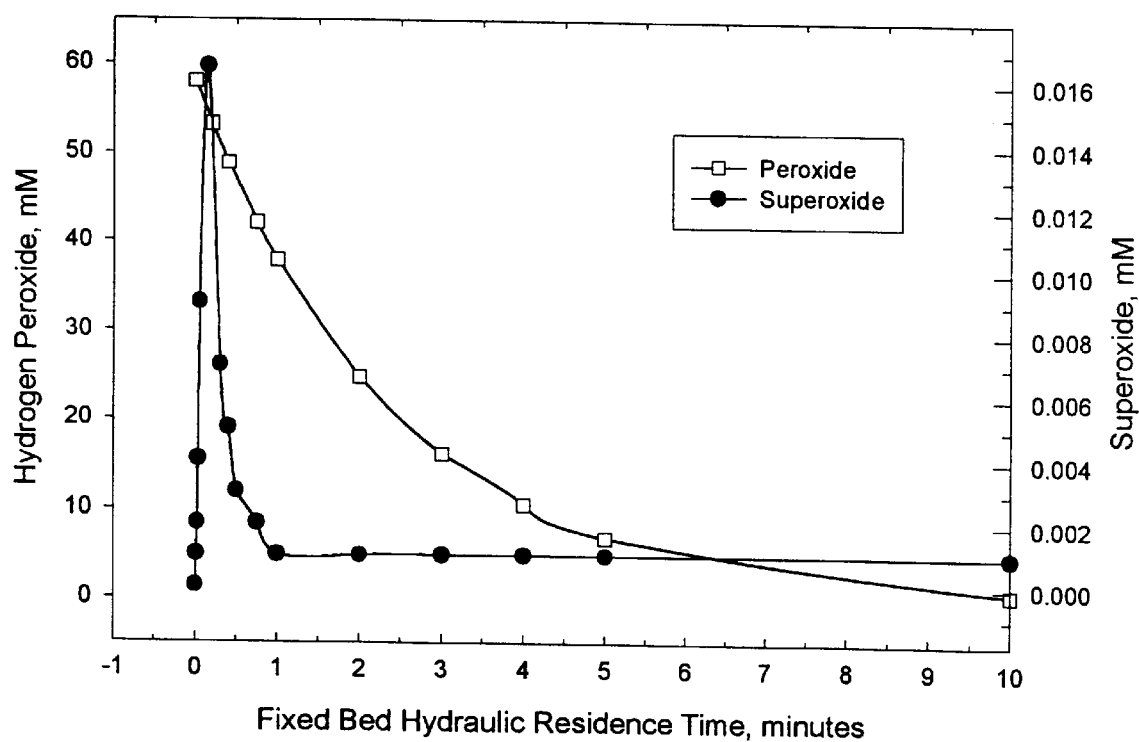
FIG. 1 is an experimental plot of hydrogen peroxide concentration versus residence time with a catalyst, and a plot representing the expected behavior of superoxide concentration versus time.

The present invention provides processes and apparatus for the degradation of contaminants in aqueous media by employing hydrogen peroxide. More specifically, the process and apparatus exploit the reactive intermediates formed by the decomposition of hydrogen peroxide in the presence of a catalyst and their eventual reaction with contaminants in aqueous media.

The decomposition of hydrogen peroxide is catalyzed by metals, such as iron, copper and manganese. The decomposition of hydrogen peroxide forms free radicals, also referred to as reactive intermediates. These reactive intermediates are believed to include, potentially among others, hydroxyl radicals (OH·), perhydroxyl radicals (·HO$_2$), and superoxide anions (O$_2^-$). A free radical or reactive intermediate is generally defined as a species that contains one or more unpaired electrons. Due to its unpaired electron, most free radicals are very reactive and have extremely short lifetimes. Studies show that the hydroxyl radical (OH·) is the most reactive species for the degradation of contaminants.

Without wishing to be bound by any particular theory, it is believed that the following chemistry is involved in the reaction of hydrogen peroxide with metal oxide, and that a discussion of the same will serve to facilitate the disclosure of the present invention. Accordingly, the following theoretical discussion should not serve to limit the present invention, rather the claims will define the scope of the invention.

Where S and S$^+$ represent reduced and oxidized catalyst sites, respectively, it is believed that the following reaction occurs.

$$S+H_2O_2 \rightarrow S^+ + OH^- + \cdot OH \quad (I)$$

$$S^+ + H_2O_2 \rightarrow S + \cdot HO_2 + H^+ \quad (II)$$

Because of its formation near the catalyst surface and its extreme reactivity, especially toward the catalyst, the hydroxyl radical (·OH), formed per reaction (I), is likely scavenged by the catalyst according to the following.

$$S^{n+} + \cdot OH \rightarrow S^{(n+1)+} + OH^- \quad (III)$$

By scavenged it is meant that the reactive intermediate is reacted with a reagent other than the desired contaminant molecule, i.e. the reactive intermediate is not usable. In equation (III), the other reagent is the catalyst.

It should be appreciated that the perhydroxyl radical (·HO$_2$), formed in reaction (II) is also reactive with the catalyst, but because it is less reactive than the hydroxyl radical, a greater concentration of perhydroxyl radical (·HO$_2$) escapes scavenging. In fact, the perhydroxyl radical reaction rate constant is several orders of magnitude less reactive with the catalyst than the hydroxyl radical.

Thus, it is believed that usable amounts of perhydroxyl radical (·HO$_2$) are present following hydrogen peroxide decomposition. It is further believed that the perhydroxyl radical exists in equilibrium with a proton and a superoxide molecule (O$_2^-$) according to the following equilibrium reaction.

$$\cdot HO_2 \leftrightarrow H^+ + O_2^- \quad (IV)$$

Both the perhydroxyl radical (·HO$_2$) and the superoxide (O$_2^-$) are of interest because they react with hydrogen peroxide to form hydroxyl radicals (·OH), which are believed to be the most desirable intermediate for the degradation of contaminants. The reactions of these intermediate products with hydrogen peroxide are as follows.

$$\cdot HO_2 + H_2O_2 \rightarrow \cdot OH + H_2O + O_2 \quad (V)$$

$$O_2^- + H_2O_2 \rightarrow \cdot OH + OH^- + O_2 \quad (VI)$$

It should be appreciated that the reaction of the perhydroxyl radical with hydrogen peroxide, as demonstrated in Formula (V) is in fact kinetically faster than the reaction of superoxide with hydrogen peroxide as demonstrated in Formula (VI). Thus, it should be understood that the pH of the system will affect hydroxyl radical formation and scavenging by the catalyst. In other words, it has been found that acidic conditions will improve the efficiency of useful intermediates per hydrogen peroxide decomposed.

Accordingly, the ability of superoxide and perhydroxyl radicals to further react with hydrogen peroxide and form hydroxyl radicals is believed to be critical. These reactions, however, are slow when compared with the reaction of perhydroxyl radical or superoxide with the catalyst. In fact, reaction (V) and (VI) are believed to be several orders of magnitude slower than the following reactions with the catalyst, i.e. S and S$^+$.

$$S^+ + O_2^- \rightarrow S + O_2 \quad (VII)$$

$$S + \cdot HO_2 \rightarrow S^+ + HO_2^- \quad (VIII)$$

Therefore, it is understood that the reaction of perhydroxyl radicals and superoxides with the metal catalyst sites is faster, and thus more competitive, than that of the perhydroxyl radical and superoxide with the hydrogen peroxide. The fact that the reaction of the perhydroxyl radical and superoxide with the metal site is faster and more competitive, from a chemical kinetics standpoint, inhibits the production of the desired hydroxyl radical. In other words, the perhydroxyl radical and superoxide are scavenged prior to their reaction with hydrogen peroxide. The ability of the hydrogen peroxide, therefore, to oxidize and ultimately degrade contaminants is severely limited.

This analysis explains the results observed heretofore in the art wherein contaminant degradation is severely limited in the presence of a catalyst. With reference to FIG. 1, there is depicted a general representation of superoxide concentration in the presence of a catalyst over time. Also depicted is hydrogen peroxide concentration over time. As stated above, it is believed that the reduction in superoxide concentration results from scavenging of the superoxide by the catalyst at large contact or residence times. It should be further understood that because superoxide concentration decreases rapidly after long periods of contact with the catalyst, the ability of the system to degrade contaminants is also reduced at this point.

In sum, it is believed that over-exposure or prolonged catalysis of hydrogen peroxide to a catalyst will not produce significant concentrations of intermediates useful for the oxidation of contaminants. The useful reactive intermediates, or their predecessor intermediates, are scavenged prior to reacting with the contaminant.

In order to overcome this problem, the present invention provides processes and apparatus by which scavenging of reactive intermediates is reduced and preferably minimized, thereby increasing contaminant degradation. The processes and apparatus reduces and preferably minimizes scavenging by manipulating the reaction time or exposure of the hydrogen peroxide with the catalyst. It should be understood that by reducing scavenging, the concentration of useful reactive intermediates per amount hydrogen peroxide decomposed is increased, which in turn increases contaminant degradation per hydrogen peroxide decomposed.

For purposes of this disclosure, the processes or apparatus of the present invention will be discussed with reference to an aqueous stream containing contaminants. The term aqueous stream will generally refer to an aqueous media having contaminants dissolved therein, but this term should not be viewed as limiting the disclosure of the present invention inasmuch as solid particles suspended within the media can also be included. Further, the term contaminants will include organic contaminants such as phenol, quinoline and nitrobenzene, which are dissolved within the aqueous media. The contaminants disclosed herein, however, should also not be viewed as limiting the scope of the invention inasmuch any contaminant that is subject to degradation or destruction by oxidation, e.g. reaction with hydroxyl, can be treated by the system.

Furthermore, for purposes of this disclosure, reference will be made to useful reactive intermediates. With the above teachings in mind, reactive intermediates refers to those radicals that react with and oxidize contaminants, or those radicals or intermediate compounds that react with hydrogen peroxide to form radicals that react with and oxidize contaminants. Moreover, useful reactive intermediates refers to those radicals available for oxidation of a contaminant. That is, those reactive intermediates that are not scavenged by the catalyst.

Specifically, the process of the present invention involves adding hydrogen peroxide to a contaminated aqueous stream and passing the stream through a fixed bed containing a catalyst. The catalyst is preferably a catalytically active granular media. The decomposition of hydrogen peroxide, which leads to reactive intermediate formation, is catalyzed by metal oxides contained on the granular media. A variety of natural or synthetic materials may be utilized such as conventional filter sand, which typically is coated with active iron oxides, or a granular material to which iron or other active metal oxides have been deposited. Other materials include iron coated sand, conventional filter sand and naturally obtained river sand, e.g. that obtained from the Iowa river, or acid rinsed sand.

The amount of hydrogen peroxide added to the system is typically a function of the mass of contaminants to be degraded. Generally, about 3 to about 50 milligrams of hydrogen peroxide is used per milligram of contaminant. It is more desirable to use smaller quantities of hydrogen peroxide per quantity of contaminant for cost considerations. Accordingly, a more efficient system will be able to employ less than about 20 milligrams, preferably less than about 10 milligrams, and more preferably less than about 5 milligrams of hydrogen peroxide per milligram of contaminant. It should be understood that the amount of hydrogen peroxide necessary is dependent on the catalytic material employed as well as other conditions such as temperature and pH, and even the nature of the contaminants.

The process of the present invention further entails removing the stream from the catalyst reactor when the concentration of reactive intermediates resulting from hydrogen peroxide decomposition is at or near its greatest concentration while in the presence of the catalyst. With reference to the above discussion, the time at which the stream would be removed from the presence of the catalyst would be prior to a time that scavenging reduces the concentration of reactive intermediates to an undesired level. That is, the aqueous stream is contacted with the catalyst for a time sufficient to form perhydroxyl radicals and superoxides and yet reduce and preferably minimize the subsequent reaction of the perhydroxyl radicals and superoxides with the catalyst. Once removed from the catalytic environment, scavenging can no longer take place. Within the art, contact time with the catalyst is also referred to as residence time or exposure time.

Because each catalyst material that may be employed in the processes or apparatus of the present invention can have a different reactivity toward hydrogen peroxide, the exposure time desired according this invention cannot be stated in general terms. That is, the time that the aqueous stream should be in contact with the catalyst is a function of the catalyst employed. Bottom line, the exposure time should be long enough to increase and preferably maximize the concentration of usable reactive intermediates and short enough to reduce and preferably minimize the scavenging of the reactive intermediates that are formed.

To best understand the time at which the aqueous stream should be removed from the catalytic reactor, reference is made to FIG. 1. As can be seen, it is believed that for most catalytic materials, the exposure time necessary to reach the maximum reactive intermediate concentration is very short. Furthermore, it is believed that scavenging of these radicals also occurs within a very short time span. Thus, for most catalytic materials, the aqueous stream should only contact the catalyst for a short time before being removed from the catalytic environment. With reference again to FIG. 1, maximization of superoxide and/or perhydroxyl radical concentration is achieved with a catalyst exposure time that corresponds to that area of the plot where superoxide and perhydroxyl radical concentration is the greatest. It should be understood that FIG. 1 is a hypothetical representation of useful reactive intermediate concentration or that concentration capable of leaving the catalytic environment without being scavenged.

For example, in one embodiment of the present invention, where conventional filter sand is employed as the catalytic material, the time that the aqueous stream should be in contact with the catalyst is generally less than about five minutes, preferably less than about 1 minute, more preferably less than about 0.5 minutes, and even more preferably in the range from about from about 0.05 to about 0.25 minute.

The exposure time to the catalyst, t, may also be defined in terms of the hydrogen peroxide decomposition desired for any given exposure period. This can be determined using the formula $-Ln\ (C_{/C_o})k_{obs}=t$; where C is the hydrogen peroxide concentration of the effluent leaving the catalytic environment, $C_o$ is the hydrogen peroxide concentration entering the catalytic environment and $k_{obs}$ is a first order rate constant characterizing the hydrogen peroxide decomposition rate in the fixed bed at given reaction conditions. One of ordinary skill in the art, without undue experimentation, can readily determine $k_{obs}$ for any given catalyst.

Accordingly, it is an aspect of a preferred embodiment of the present invention to obtain less than about 5% hydrogen peroxide decomposition per period or per pass through the catalytic environment. Preferably, hydrogen peroxide decomposition is less than about 3% and more preferably less than about 1% per pass.

After exposed to the catalytic material within the catalytic reactor for the desired period of time, the aqueous stream is removed from the catalytic reactor and introduced to an external reactor containing essentially no catalyst. Within this external reactor, and outside of the presence of catalytic material, it is believed that the superoxide and perhydroxyl radicals formed within the catalytic reactor react with hydrogen peroxide to form the desired hydroxyl radical. As discussed above, it is believed that the reaction taking place within the external reactor is successful because the competing catalytic sites are not present to scavenge the radicals.

The reactive intermediates present and formed in the external reactor are allowed to react with the contaminants therein for the purpose of degradation of the same. Although the time that the aqueous stream is in contact with the catalytic material is very short, as discussed above, the time that the aqueous stream is within the external reactor is much greater. Namely, it is desirable to provide a reaction time within the external reactor that is at least about 50 times greater than the exposure time with the catalytic material. Preferably, the time within the external reactor should be greater than 60 times the exposure time with the catalytic material and even more preferably about 100 times greater than the exposure time with the catalytic material.

In a preferred process of the present invention, the aqueous stream is placed in a cycle between the catalytic reactor and the external reactor, i.e. the aqueous media reexposed to the catalytic environment for a period as described hereinabove. Using this method, the greatest contaminant degradation is achieved. In other words, one pass through the catalytic reactor followed by one period within the external reactor does not achieve maximum contaminant degradation because only a fraction of the total hydrogen peroxide is decomposed while in the short presence of the catalyst. It should be understood that the efficiency of useful reactive intermediates derived from this small amount of hydrogen peroxide decomposition is large even though the net effect is a small amount of peroxide decomposition.

Thus, the process of the present invention recycles the aqueous stream through several cycles, each cycle including the specified time within the catalytic reactor and the specified time within the external reactor. As the cycles increase, total hydrogen peroxide decomposition increases which in turn provides for an increase in the total useful reactive intermediates; and yet the efficiency of useful reactive intermediates available to the system per hydrogen peroxide decomposition is maintained at desirable levels because of the above described manipulation of the exposure time with the catalyst per cycle.

It should be appreciated that the number of cycles that the process of the present invention includes is a function of contaminant concentration and desired contaminant degradation.

It should be further understood that the process of the present invention can include a closed recycle process, i.e. batch process, or an open recycle process, i.e. a continuous feed process. By closed recycle process, it is meant that a fixed amount of aqueous media, having a fixed amount of contaminant therein, is introduced to the process and recycled until a desired contaminant degradation is achieved. In an open system process, additional aqueous media, having contaminants therein, and hydrogen peroxide are continually added to the recycle process while purified aqueous media is removed. Purified aqueous media referring to a media where sufficient contaminant degradation has been achieved.

Figure 2:
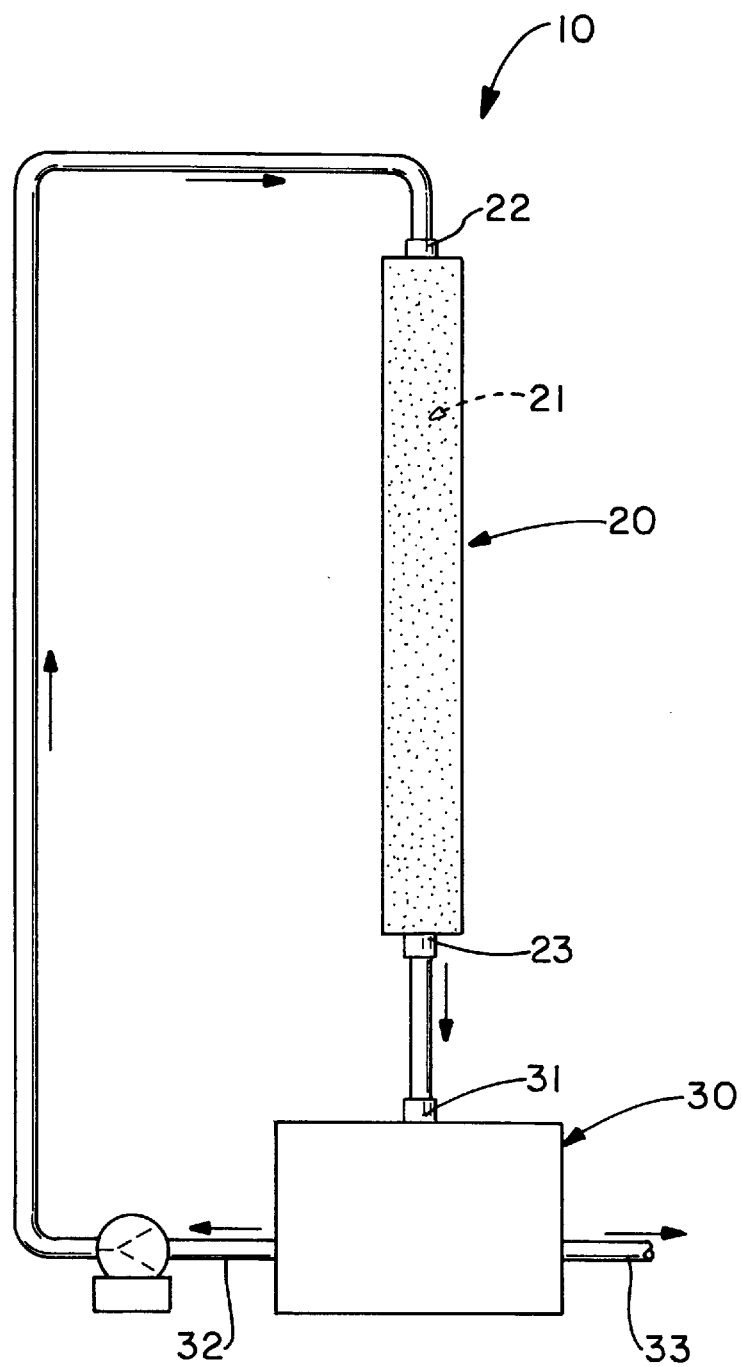
FIG. 2 is a flow diagram and schematic of a preferred reactor of the present invention.

A preferred apparatus according to the present invention is a continuous feed reactor as generally depicted in FIG. 2. It should be understood, for purposes of this disclosure, that appropriate pumping devices and conduits are employed to move material between various stages or portions of the reactor or reactor system.

The reactor 10 has a catalytic bed reactor portion 20 containing a catalyst 21. The catalyst 21 is as described above. The catalytic bed reactor 20 is configured such that an aqueous stream is received at inlet 22, passed across catalyst 21, and emitted at outlet 23.

The reactor 10 further includes an external reactor 30, which receives an aqueous stream at inlet 31. External reactor 30 contains essentially no catalyst. In a preferred embodiment, the external reactor 30 has recycle outlet 32 for allowing the aqueous stream to recycle back to the catalytic bed reactor 20. The external reactor 30 can also have an effluent outlet 33 for allowing the aqueous stream to leave the reactor 10.

As discussed above, the aqueous stream exits the fixed bed portion containing the catalytic material at 23. The aqueous stream is then discharged into effluent batch reactor 30 at inlet 31. The volume of the effluent reactor 30 is sufficiently larger than that of the fixed bed portion so as to provide a greater reaction time, as described hereinabove. Again, it is believed that perhydroxyl radicals and superoxides formed in the fixed bed portion are allowed to then react with hydrogen peroxide in the effluent reactor to form hydroxyl radicals. These highly reactive hydroxyl radicals, most of which are formed in the effluent reactor, are then allowed to react with contaminants and degrade the same. It should be appreciated that reactions responsible for the loss of contaminant occur both in the fixed bed 20 and in the effluent reactor 30, as do reactions between the reactive intermediates and hydrogen peroxide to form hydroxyl radicals. What the art heretofore fails to teach, however, is that contaminant degradation is improved when allowed to take place in a reactor absent the presence of a catalyst.

The treated aqueous stream may then be discharge as waste to an effluent stream at 33 or recycled back through the reactor at 32 for further treatment. Accordingly, the reactor may be operated to recycle the contaminant and hydrogen peroxide containing stream in batch recycle mode in which the system is charged with contaminant and hydrogen peroxide. It should further be appreciated that the apparatus of the present invention can be operated in any flow direction, i.e. the aqueous stream can flow upward through the catalytic bed, downward through the bed, or across the bed. It is most preferred to operate in an upflow fluidized mode through the catalytic bed, with the external reactor being well mixed or plug flow.

EXAMPLE

In order to demonstrate the practice of the present invention, the following experimentation were performed. In one example, Example 1, an attempt was made at degrading 0.0800 mM of quinoline in aqueous solution employing an apparatus wherein the aqueous media having the quinoline dissolved therein was contacted continuously for about ten minutes with conventional filter sand (Northern Gravel filter sand), which served as a catalytic material. In the other experiment, Experiment 2, 0.0786 mM of quinoline was introduced to a recycle reactor according to the present invention, employing the same catalyst.

The apparatus of Example 1 was conducted in a once-through fixed bed reactor that was filled with 40 grams of the catalyst material with a empty pore volume of 9.42 mL. The solutions were stored in a 100 mL Scientific Glass Engineering gastight syringes and were introduce into the column by a Harvard Apparatus Pump Model 22 at a hydraulic residence time of 11.8 minutes. Aqueous media having quinoline dissolved therein was delivered to the column until breakthrough, at which time hydrogen peroxide was mixed with the quinoline solution and then introduced to the column. The steady state conditions for the column were assumed when the effluent concentration for several bed volumes was within the normal standard deviation of measurement.

The apparatus employed in Experiment 2 included 5 grams of catalyst (1.18 mL empty pore volume) and an external reservoir volume of 98.82 ml. The aqueous media, having quinoline dissolved therein, was recycled through the column by a Cole Parmer diaphragm pump, at a flow rate of 12 mL per minute. The solution reservoir was kept in a 250 mL Erlenmeyer flask with pH of 7, which was controlled by various $CO_2$/air mixtures.

With reference to Experiment 1, contaminant degradation was analyzed by high pressure liquid chromatography (HPLC). The results showed that less than 1% of the dissolved quinoline that was added to the system was degraded. In fact, increasing exposure time with the catalytic system resulted in decreasing amounts of contaminant loss, with practically no contaminant degradation occurring in the time span between 12 and 30 minutes.

The results of Experiment 2, which was performed according to the teaching of the present invention, are represented in Table I.

TABLE I

| Clock Time (Min) | Approximate Catalyst Contact Time (Min) | Peroxide Concentration (mM) | Quinoline Concentration (mM) |
|---|---|---|---|
| 0 | 0 | 57.9000 | 0.0786 |
| 34 | 0.40 | 50.1780 | 0.0712 |
| 75 | 0.88 | 41.8009 | 0.0640 |
| 128 | 1.5 | 33.1034 | 0.0570 |
| 255 | 2.99 | 20.1856 | 0.0438 |
| 479 | 5.58 | 7.5528 | 0.0329 |
| 791 | 9.27 | 2.0929 | 0.0275 |
| 1237 | 14.5 | 0.3169 | 0.0262 |

As is evident from the data in the table, greater than 95% of the hydrogen peroxide was decomposed after about 15 minutes of contact with the catalytic system and about 1200 minutes in the entire reactor. This amount of hydrogen peroxide decomposition corresponds to about 65% quinoline degradation (0.0275/0.0786). Further examples demonstrating the practice of the present invention are described in the Ph.D. dissertation of Christopher M. Miller entitled "Hydrogen Peroxide Decomposition and Contaminant Degradation in the Presence of Sandy Aquifer Material" (1995), which is incorporated herein by reference.

Thus it should be evident that the device and methods of the present invention are highly effective in treating contaminated aqueous media. The invention is particularly suited for recycle operation, but is not necessarily limited thereto. The device and method of the present invention can be operated in single pass operation or as a series of consecutive cycles, i.e. consecutive reactions.

Based upon the foregoing disclosure, it should now be apparent that the use of the processes and apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A process for the treatment of an aqueous media having contaminants therein, comprising:

adding hydrogen peroxide to the aqueous media;

exposing the aqueous media to a catalytic environment; and removing the aqueous media from the catalytic environment prior to the aqueous media having a five minute residence time within the catalytic environment.

2. A process for the treatment of an aqueous media, as set forth in claim 1, wherein said step of removing occurs prior to the aqueous media having a one minute residence time with the catalytic environment.

3. A process for the treatment of an aqueous media, as set forth in claim 2, wherein said step of removing occurs prior to the aqueous media having a one-half minute residence time with the catalytic environment.

4. A process for the treatment of an aqueous media, as set forth in claim 3, wherein the aqueous media has a residence time within the catalytic environment of from about 0.05 to about 0.25 minute.

5. A process for the treatment of an aqueous media, as set forth in claim 1, further comprising the step of placing the aqueous media in a reaction tank after said step of removing from the catalytic environment, and then subsequently reintroducing the aqueous media to the catalytic environment.

6. A process for the treatment of an aqueous media having contaminants therein comprising the steps of:

adding hydrogen peroxide to an aqueous media;

exposing the aqueous media to a catalytic environment; and removing the aqueous media from the catalytic environment before five percent of the hydrogen peroxide decomposes.

7. A process for the treatment of an aqueous media, as set forth in claim 6, wherein said step of removing the aqueous media from the catalytic environment occurs before three percent of the hydrogen peroxide decomposes.

8. A process for the treatment of an aqueous media, as set forth in claim 7, wherein said step of removing the aqueous media from the catalytic environment occurs before one percent of the hydrogen peroxide decomposes.

9. A process for the treatment of an aqueous media, as set forth in claim 6, further comprising the step of placing the aqueous media in a reaction tank after said step of removing from the catalytic environment, and then subsequently reintroducing the aqueous media to the catalytic environment.

10. An improved process for degrading organic contaminants within an aqueous media of the type where hydrogen peroxide is added to the aqueous media, and the aqueous media containing the hydrogen peroxide is introduced to a catalytic environment to initiate decomposition of the hydrogen peroxide, wherein the improvement comprises controlling the exposure of the hydrogen peroxide to the catalytic environment so that the aqueous media is removed from the catalytic environment before five percent of the hydrogen peroxide entering the catalytic environment is decomposed by the catalytic environment.

11. An improved process for degrading organic contaminants, as set forth in claim 10, wherein the aqueous media is removed from the catalytic environment before three percent of the hydrogen peroxide entering the catalytic environment is decomposed by the catalytic environment.

12. An improved process for degrading organic contaminants, as set forth in claim 10, wherein the aqueous media is removed from the catalytic environment before one percent of the hydrogen peroxide entering the catalytic environment is decomposed by the catalytic environment.

* * * * *